Dec. 9, 1969  J. C. O'BRIEN  3,483,065
APPARATUS FOR ASSEMBLING PLYWOOD VENEERS
Filed July 5, 1966  4 Sheets-Sheet 1
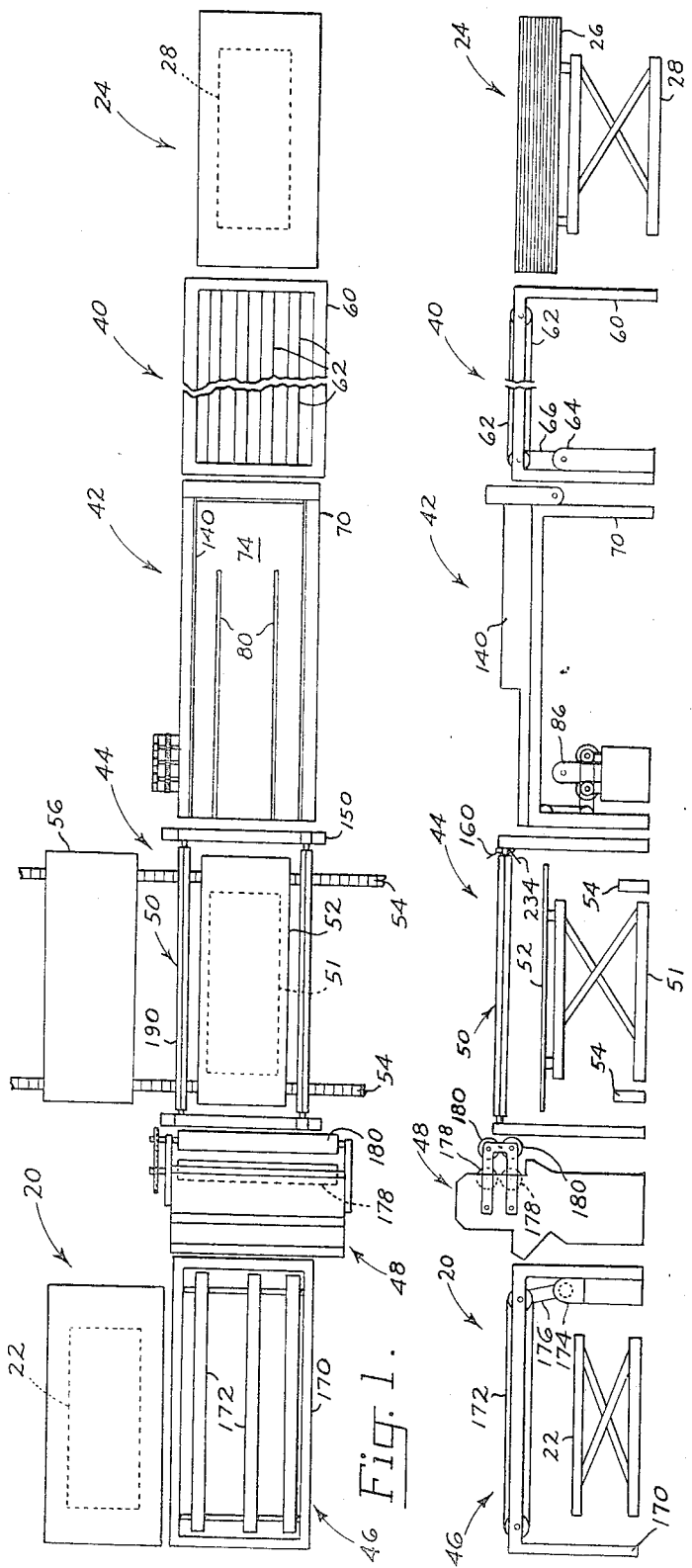
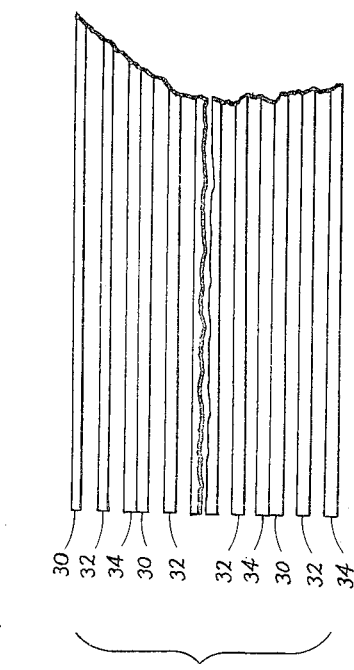
John C. O'Brien
INVENTOR
BY
Eugene O. Farley
Atty.

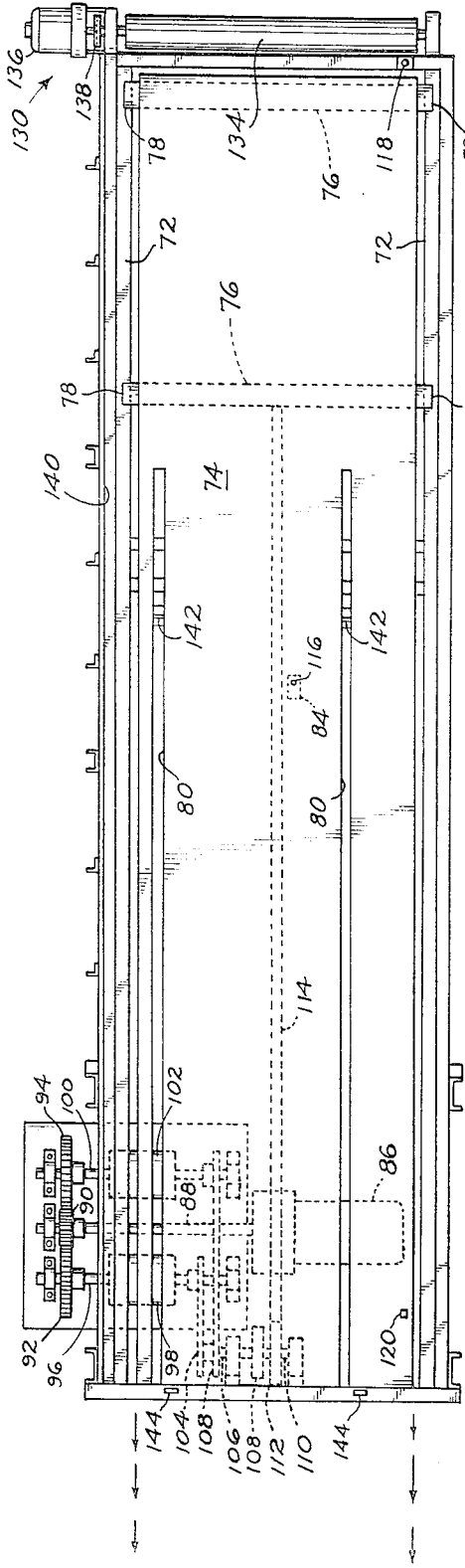
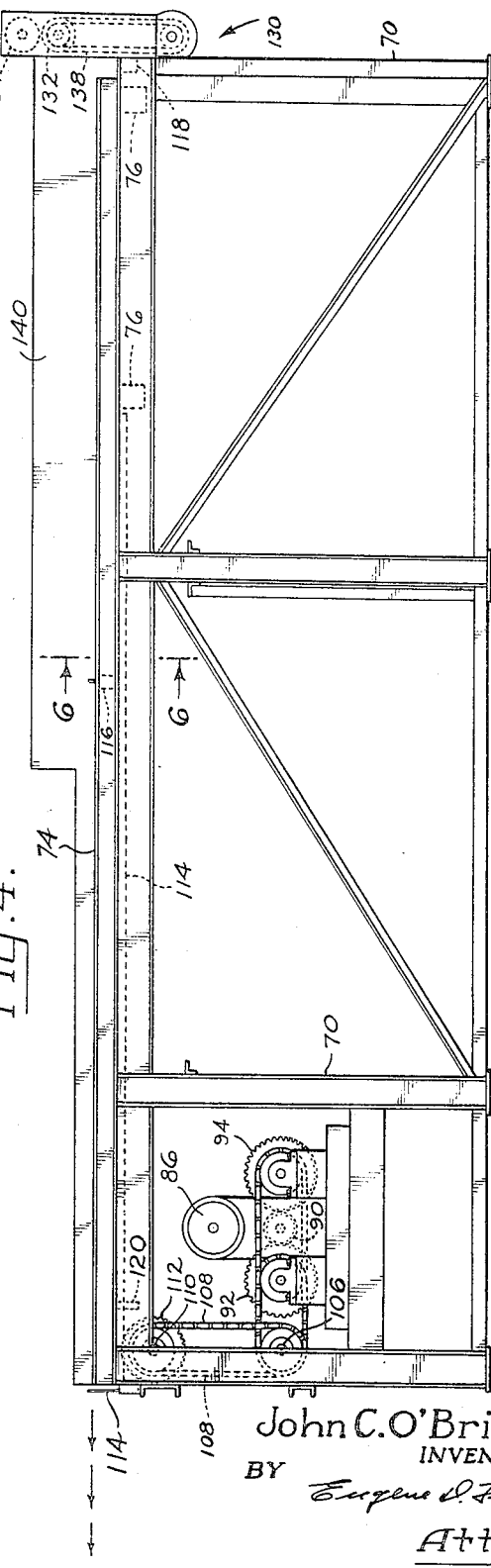

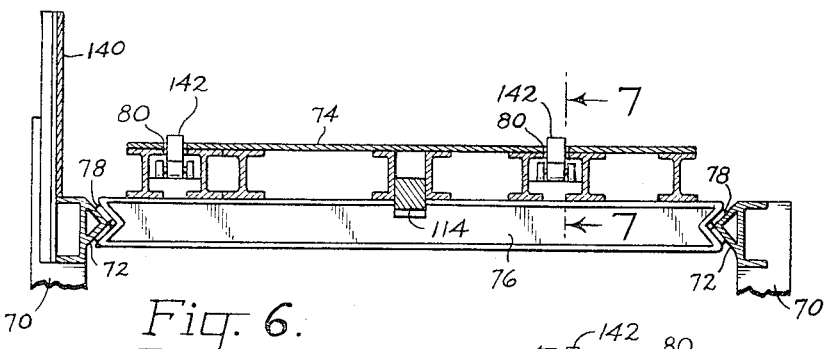
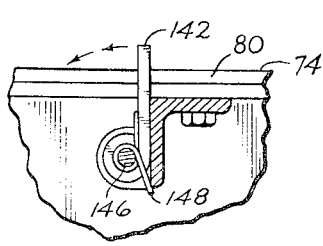
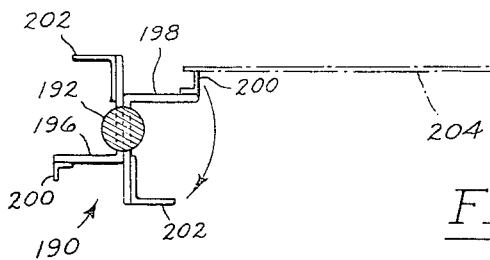
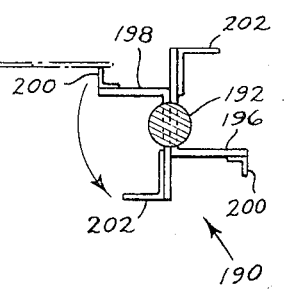
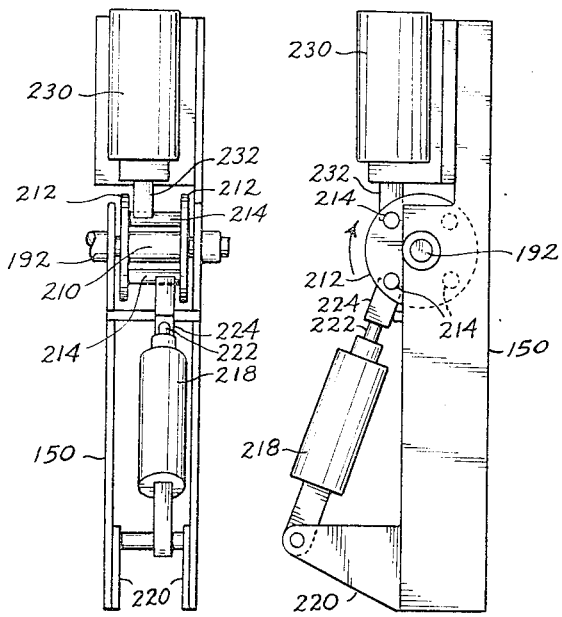
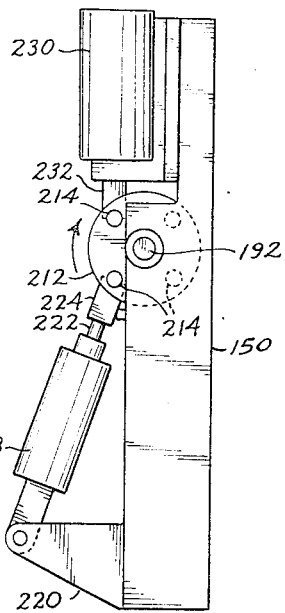

United States Patent Office 3,483,065
Patented Dec. 9, 1969

3,483,065
APPARATUS FOR ASSEMBLING
PLYWOOD VENEERS
John C. O'Brien, 210 E. 15th, Apt. 8,
Vancouver, Wash. 98663
Filed July 5, 1966, Ser. No. 562,910
Int. Cl. B32b 21/14
U.S. Cl. 156—563          6 Claims

ABSTRACT OF THE DISCLOSURE

A plywood assembly support receives unglued veneers from one direction and glued core veneers from the opposite direction in interleaved arrangement for subsequent pressing. The unglued veneers are delivered to the support on a horizontally reciprocating table and the glued core veneers are delivered to the support by edge-supporting rotary indexing transfer means.

---

This invention relates to apparatus for assembling plywood veneers preparatory to pressing them into plywood panels.

Despite many innovations, the plywood industry still is plagued with two principal problems: high labor costs, and production of a relatively high proportion of plywood panels which are rejectable because of core gaps, core laps, or inefficient glue spread.

Accordingly it is the general object of the present invention to provide apparatus for assembling plywood veneers which is characterized by the following principal advantages:

(1) It requires minimum labor, but three operators being required to operate a veneer assembly line serving a 30-opening hot press, or two 20-opening hot presses.

(2) It makes possible more precise quality control, with particular reference to the elimination of plywood panels rejectable because of problems of core gaps, core laps, and poor glue spread.

(3) It is substantially automatic in operation and will lay up a complete press charge without manual attention other than feeding to the apparatus the constituent veneers in proper sequence.

(4) It enables a 5-7% saving in glue costs.

(5) It reduces the number of rejects by 80%.

(6) The apparatus is of relatively simple, inexpensive construction and hence is available to small mills.

The manner in which the foregoing and other objects of this invention are accomplished will be apparent from the accompanying specification and claims considered together with the drawings, wherein:

FIG. 1 is a schematic plan view of a plywood assembly line including the units of the herein described plywood veneer assembling apparatus;

FIG. 2 is a schematic view in side elevation of the assembly line of FIG. 1;

FIG. 3 is a schematic view illustrating a prestacked arrangement of unspread veneers, i.e. face, back and center veneers, arranged in a sequence predetermined to constitute an entire press load;

FIG. 4 is a plan view of a charging and aligning unit employed in conjunction with conveying means for conveying unspread face, back and center veneers to the assembling station;

FIG. 5 is a view in side elevation of the charging and aligning unit of FIG. 4;

FIG. 6 is a transverse, sectional view taken along line 6—6 of FIG. 5 and illustrating in detail the construction of a cantilevered table employed in the charging and aligning unit of FIG. 4;

FIG. 7 is a detail, sectional view taken along line 7—7 of FIG. 6 and illustrating retractable pushing means associated with the charging and aligning unit for engaging and pushing veneers placed thereon;

Figure 9:
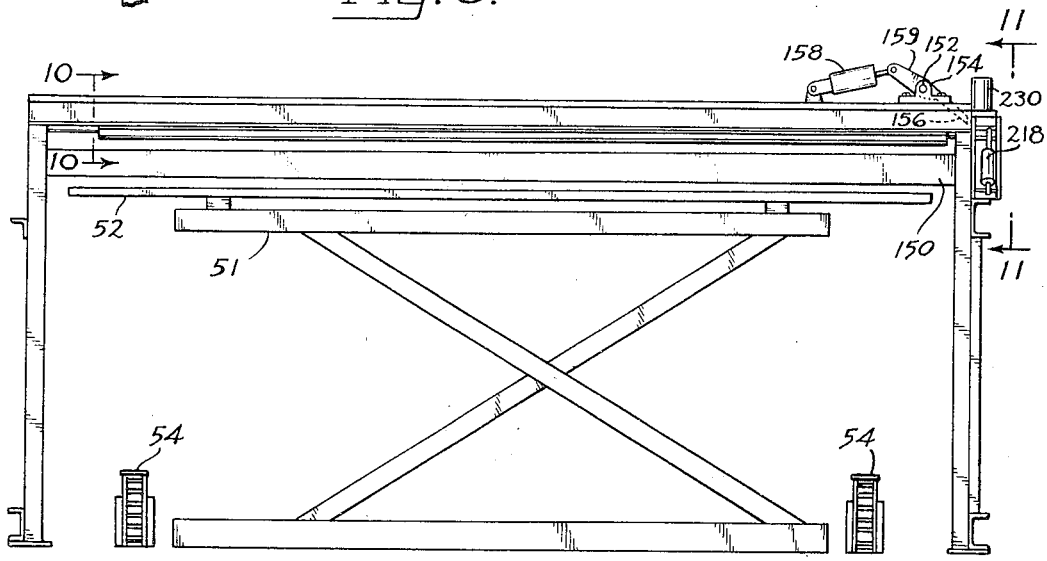
FIG. 9 is a view in side elevation of the support unit of FIG. 8.

FIG. 10 is a detail view in transverse cross section taken along line 10—10 of FIG. 9 and illustrating the construction of rotary transfer means employed in transferring spread core veneers at the assembly station; and FIGS. 11 and 12 are views in front and side elevation, respectively, taken along line 11—11 of FIG. 9, of apparatus for adjusting the rotary transfer means between positions of core veneer support and core veneer release.

Generally stated, the presently described method for assembling plywood veneers comprises placing a first unspread surface veneer on a support; supporting by its side edges above the first unspread veneer, in substantial registration therewith, a core veneer spread with unset glue; dropping the core veneer on the first surface veneer; and superimposing a second surface veneer on the core veneer to complete a three-ply veneer assembly. Where assemblies comprising more plies than three are to be prepared, the foregoing sequence may be modified to include face, back and center veneers in appropriate sequence.

The apparatus comprising the present invention broadly includes units for accomplishing the foregoing sequence of method operations. It thus includes basically assembly support means for supporting a stack of assembled veneers in a central station. Conveying means for conveying veneers unspread with glue are arranged for projecting the face, back and center veneers endwise into the assembly support means. Core veneer support means are positioned above the assembly support means in substantial registration therewith. The core veneer support means is arranged for receiving core veneers spread with unset glue, and for supporting them by their side edges.

Core veneer conveying means are arranged for conveying the spread core veneers to the core veneer support means. Adjusting means are provided for adjusting the core veneer support means between positions of core veneer support, wherein the core veneer is supported above the assembly support means, and core veneer release, wherein the core veneers are dropped downwardly upon the assembly support means. Accordingly, by alternate operation of the conveying means for the unspread veneers and for the spread core veneers, any desired sequence of plywood assembly may be pursued and continued until a stack comprising a complete press charge has been composited. Off bearing conveyor means then are provided for conveying the stack away to the prepress.

Considering the foregoing in greater detail and with particular reference to the drawings:

THE APPARATUS IN GENERAL

The general arrangement of the line used for assembling plywood veneers by the method of the present invention is illustrated schematically in FIGS. 1 and 2. It is to be noted that there are two infeed lines, one for the spread core veneers, and the other for the unspread face, back and center veneers. The two infeed lines are diametrically opposed to each other in straight line relation. An offbearing or outfeed line is arranged at substantially right angles. The layout thus is compact and efficient and well adapted for plant operation.

Preliminary to operation of the line, there is provided a stack of core veneers, indicated generally at 20, supported on a conventional vertically indexing table 22. The core veneers are either solid, or edge-glued to full size of, for example, 99 x 49½ inches. This dimension is slightly oversize for 4 x 8′ plywood to provide for trim.

There also is provided a stack of veneers, indicated generally at 24, resting on a pallet 26 supported on a vertically indexing lift 28. The veneers comprising stack 24, in contrast with the core veneers comprising stack 20, are not to be spread with glue and hence are termed herein "unspread" veneers. They comprise face, back and center veneers to be interleaved with the core veneers in laying up three ply and higher ply assemblies.

The unspread veneers of stack 24 are stacked in prearranged order as determined by the requirements of a particular press charge. For example, if 5-plywood is to be manufactured, unspread veneer stack 24 might be arranged as shown in FIG. 3 with a back veneer 30 on top, followed in sequence by center veneer 32, face veneer 34, another back veneer 30, another center veneer 32, etc. This sequence is continued until a sufficient number of veneers has been provided in the proper sequence for filling all of the openings of the press. It is to be noted that in this sequence, face panels 34 and back panels 30 are present in pairs which may be fed as a unit, two veneers at a time, in a time saving manner.

The veneers thus provided are fed through the appropriate processing units. Thus unspread veneers from stack 24 are fed through an infeed conveyor including belt conveyor 40 which delivers them to a cooperating charging and aligning unit, indicated generally at 42. The latter in turn delivers the veneers to an assembly support unit, or layup table, indicated generally at 44.

The core veneers comprising stack 20, on the other hand, are conveyed on a diametrically opposite core veneer conveying assembly including a belt conveyor 46 which feeds a glue spreader 48 and an adjustable core veneer support and transfer unit, indicated generally at 50. The latter delivers the veneers to the assembly support unit or layup table 44 in interleaved relation with the unspread veneers delivered thereto.

Assembly support unit 44 basically comprises a vertically indexing table 51 of conventional construction. A pallet 52 is supported on the table. An offbearing conveyor comprises driven chains 54 arranged one on each side of the indexing table at a predetermined elevation.

The top of indexing table 51 is shorter than pallet 52 and the superimposed veneers. The elevation of conveyor chains 54 is appreciably above the indexing table in its lowered position. Accordingly, as the table receives its load and is indexed downwardly, pallet 52 comes into bearing engagement with offbearing conveyor chains 54 which transfer the pallet and superimposed load, indicated at 56, from the table to the prepress.

THE UNSPREAD VENEER CONVEYING SYSTEM

As noted above, the conveying system for conveying the veneer faces, backs and centers, unspread with glue, includes a belt conveyor 40 communicating with and feeding a charger and aligner 42. Belt conveyor 40 is of substantially conventional construction. It includes a frame 60 which supports a plurality of longitudinally arranged belts 62 driven at an appropriate speed by motor 64 and interconnecting drive belt 66.

The construction of the charging and aligning unit 42 is shown in detail in FIGS. 4–7 inclusive.

A suitable frame 70 mounts along its upper, inner margins a pair of angular tracks 72 which support for longitudinal, reciprocating movement a table 74. Table 74 is cantilevered on a pair of transverse support members 76, the end edges of which have an angular contour conforming to that of tracks 72 which they receive. Bearing plates 78 are welded to the angular surfaces of members 76 to provide wearing surfaces.

Table 74 is formed with a pair of spaced, parallel, longitudinal slots 80 which merge with the outfeed end of the table and through which extend push fingers, and opening 84, through which extends a limit switch, all of which are to be described later.

Table 74 is reciprocated between an extended position and a retracted position by means of a drive which preferably comprises the rack and pinion drive illustrated in FIGS. 4 and 5.

A constantly running motor 86 drives a shaft 88 mounting a sprocket 90. Sprocket 90 meshes with and drives a pair of sprockets 92, 94 which, being on opposite sides of sprocket 90, are driven in opposite directions.

Sprocket 92 is keyed to and drives a shaft 96 which includes a conventional electric clutch and brake unit 98. Sprocket 94 drives a shaft 100 which includes a second conventional clutch and brake unit 102.

Shaft 96 is connected through chain 104 to a jack shaft 106. Shaft 100 is connected to jack shaft 106 by means of chain 108.

Jack shaft 106 is connected by a chain 108 to a pinion drive shaft 110 located above jack shaft 106 in a plane just below the plane of table 74. Pinion shaft 110 mounts a pinion gear 112 which meshes with a rack 114 extending longitudinally of table 74 between slots 80.

The reciprocating movement of table 74 is controlled by limit switches 116, 118, 120.

When the first veneer is deposited on table 74, it contacts limit switch 116 which energizes the system and initiates a sequence which does not stop until the entire press charge has been assembled.

In the retracted position of table 74, i.e. the position of FIGS. 4 and 5, limit switch 118 is closed. This energizes the circuit including electric clutch and brake unit 98, engaging the clutch of that unit and releasing the brake of clutch-brake unit 102 so that the table is cantilevered outwardly to its extended position. In the extended position of the table, limit switch 120 is altered to reverse the sequence. The brake of unit 98 now is applied and clutch of unit 102 engaged to drive the table in the reverse or retracting direction.

The reciprocating table thus provided is supplied with a sequence of unspread veneers by appropriate means such as the illustrated pinch roll assembly indicated generally at 130.

The assembly includes a drive roller 132 and a cooperating, spring-pressed pinch roller 134 rotatably mounted at the infeed end of the charging table. The drive roller is driven at a suitable speed by means of a motor 136 and connecting belt 138. When the veneer is fed between the rolls, it is advanced with some force onto the surface of table 74, being guided and aligned by means of a guide plate 140 which extends longitudinally of the frame along one of its sides.

Stop means are provided for stopping the panel in its proper position on the charging table. The location of such means is indicated in FIGS. 4 and 5. Its specific construction is illustrated in FIG. 7.

The veneer stop means broadly comprises two spaced pairs of resiliently mounted stop fingers between which the veneer nests. The upstream fingers are indicated at 142 and the downstream fingers at 144.

As is particularly apparent in FIG. 7, each stop finger, as illustrated by stop finger 142, comprises a short bar of sufficient length to project upwardly above the plane of the top of table 74. The bar normally reposes in a vertical position. Its lower end is formed with a knuckle which receives a pin 146 to hinge the bar to the table framing members.

A spring 148 is included in the assembly and arranged in a position in which it resiliently urges finger 142 toward its erect position.

Stop fingers 144 are similarly constructed. As a consequence, when a veneer slides across the table top it does so with a force sufficient to depress fingers 142. Fingers 144, however, act as stops which arrest the veneer at its desired location at the end of the table.

After having been cleared by the veneer, fingers 142 resume their erect position where they serve as stops preventing the backward movement of the veneer. The veneer accordingly nests between the two pairs of stop fingers, ready for the next step in the operation.

The next operating step constitutes the transfer of the veneer from table 74 to pallet 52 on indexing table 51, which serves as the assembly suport.

Figure 8:
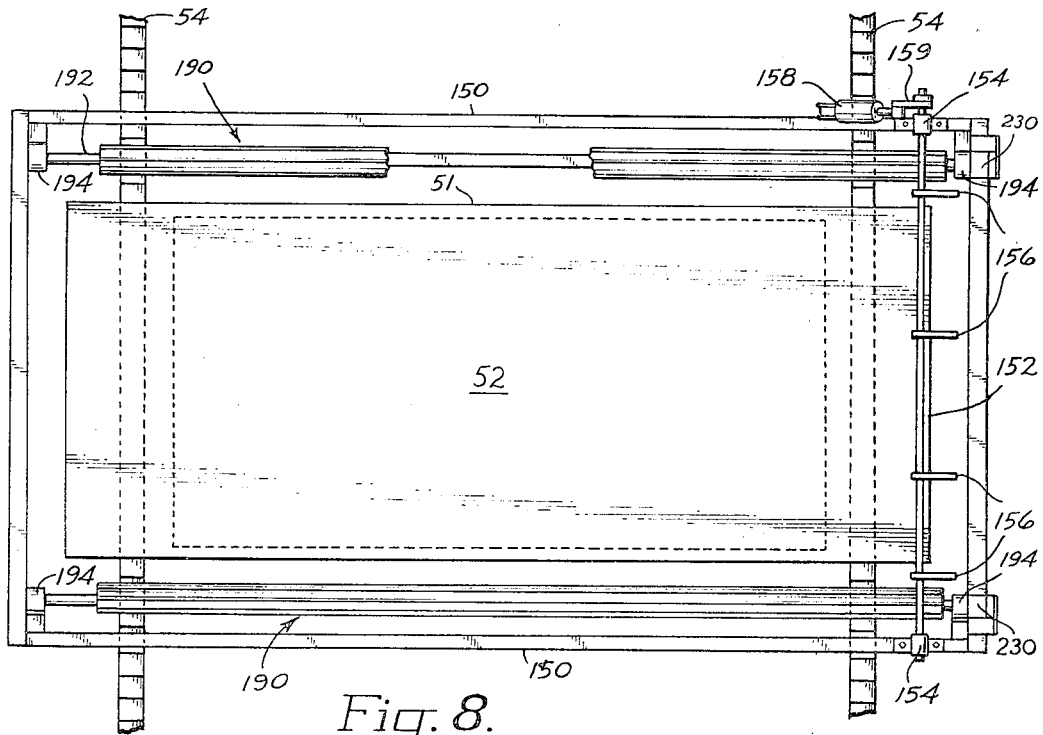
FIG. 8 is a plan view of a support unit used for supporting the veneer assemblies at an assembly station, and of means associated therewith for applying the spread core veneers.

To this end there is provided downstream from and aligned with frame 70 another frame 150, the infeed end of which supports an arm assembly having for its function engaging the downstream ends of the veneer in the fully advanced position of table 74 and scraping it off the table as the table retracts. The construction of this arm assembly is shown in FIGS. 8 and 9.

A rock shaft 152 is mounted in bearings 154 and extends transversely across the infeed end of frame 150. A plurality of arms 156 are fixed at longitudinally spaced intervals along the length of rock shaft 152. A fluid-operated cylinder 158 is connected to a crank 159, also fixed to shaft 152. The lower ends of the arms are arranged to extend below the plane of the veneer on table 74 and to engage its trailing end as indicated heretofore.

A limit switch 160 is positioned for contact by the table in its advanced position. It energizes cylinder 158, which remains in its extended position for the duration of the retracting cycle of table 74.

After retraction of table 74, the veneer, now unsupported, drops on to pallet 52 on table 51. The unspread veneer conveying system thereupon cycles to bring in another unspread veneer. In the meantime, the core veneer conveying system operates to deposit a core veneer spread with glue on the unspread back veneer which has been deposited on the pallet.

THE CORE VENEER CONVEYING SYSTEM

As has been indicated previously, at the start of the operation there is provided a stack of single piece core veneers 20 located adjacent an endless belt conveyor, indicated generally at 46, and placed in substantially straight line relation to the other units of the system.

Conveyor 46 may be of conventional construction. It comprises a frame 170 which mounts a plurality of horizontally spaced endless belts 172. The belts are driven at a suitable speed by means of a motor 174 and connecting drive belt 176.

A core veneer placed by the operator on belts 172 is conveyed by the belts to a conventional glue spreader, indicated generally at 48. The glue spreader includes glue spreading rolls 178 located upstream in adjustable spaced relation to driven star wheels 180.

Star wheels 180 transfer the core veneer to core veneer support and transfer means indicated generally at 50 and positioned above the veneer assembly support table 51 in substantial registration therewith. The core veneer transfer means is arranged for receiving a core veneer, spread with unset gulue, and for supporting it by its side edges only. As a consequence, the glue across the surface of the core veneer is undisturbed except in the trim area along the edges.

The construction of the core veneer transfer assembly is indicated particularly in FIGS. 8–12 inclusive.

Mounted on frame 150, longitudinally thereof along its side margins, and at a different elevation from the plane of table 74, preferably at a higher elevation than the plane of table 74, are a pair of rotatably mounted core veneers support and transfer rolls 190.

Each roll 190 includes a shaft 192 journaled in bearings 194. As shown in FIG. 10, the shaft mounts a pair of angle irons 196, 198, back to back. Other angle irons 200, 202 are fixed to the ends of angle irons 196, 198 in such a manner as to present the end edges of the former angle irons as supporting surfaces for supporting a spread core veneer 204 by its longitudinal side margins.

A suitable drive is provided for adjusting the position of rolls 190 by angular increments of 90°. This results simultaneously in releasing veneer 204 so that it can drop downwardly between the rolls, and in presenting the next succeeding pair of roll arms for the support of the next succeeding veneer. The drive by which this is accomplished is illustrated specifically in FIGS. 11 and 12.

One end of each of shafts 192 of core veneer transfer rolls 190 bears a fixed sleeve 210. Circular plates 212 are welded one to each end of sleeve 210 and extend radially from it. The plates mount between them a plurality of short bars or pins 214 spaced from each other at angular intervals of 90°, and arranged parallel to and spaced outwardly from sleeve 210.

The core support rolls are indexed 90° at a time by a cooperating fluid-operated cylinder and electric solenoid. The cylinder 218 is pivotally connected to a bracket 220 extending outwardly from frame 150. The piston rod 222 of the cylinder is provided with a head 224 having a yoke-shaped depression dimensioned to receive pins 214, one at a time.

Electric solenoid 230 has a spring-pressed solenoid bar 232 which is urged normally to an extended position. The end of the solenoid bar is formed with a recess which, like the recess in the end of cylinder head 224, is dimensioned for the reception of pins 214.

Cylinder 218 and solenoid 230 work in opposite directions. When energized by limit switch 234, cylinder 218 extends while at the same time solenoid 230 retracts. Core support roll 190 accordingly is rotated by 90°. Solenoid 230 thereupon advances to contact the next in its sequence of pins 214 while cylinder 218 retracts, ready for engagement with the next of its sequence of pins 214.

Operation

The operation of the presently described apparatus for assembling plywood veneers is as follows:

With the units of the apparatus arranged as shown in FIGS. 1 and 2, stacks of unglued core veneers 20 and of face, back and center veneers 24 in proper sequence are located adjacent the respective infeed conveying systems.

One operator stands adjacent each stack to feed the veneers. A second or supervisory operator may stand adjacent layup unit 50 to oversee the operation and align the panels, if necessary.

To start the sequence, the operator places a back veneer 30 on conveyor unit 40. This passes the veneer between pinch rolls 132, 134. These in turn pass the veneer on to table 74 where it contacts limit switch 116. FIG. 4, initiating a timing cycle which will not stop until the entire press charge has been assembled.

The veneer passes over retractable fingers 142 and comes to rest against stop fingers 144 which position it at the end of the table. It also contacts limit switch 118. Thereupon motor 86, working through a rack and pinion drive including rack 114 and pinion 112, cantilevers table 74 in the outfeed direction.

Upon full extension of the table, contact is made with limit switch 120, which reverses the table drive and retracts the table. At the same time, scrap-off arms 156, activated by limit switch 160, are shifted through the action of cylinder 158 to their downward positions of FIGS. 8 and 9.

Working in slots 80 in the table surface, the arms scrape the veneer off the table as the latter retracts. The fingers 144 are retracted by the veneer as the table is retracted. The veneer thereupon gravitates downwardly onto pallet 52 on indexing table 51.

While this sequence is in progress, the core veneer operator has fed a solid core veneer onto core veneer infeed conveyor 46. The veneer is transferred to glue spreader 48 through glue applicator rolls 178 and star wheels 180. The glued core veneer then is driven by the star wheels onto core veneer support and transfer rolls 190.

After the unspread veneer has been removed from table 74 and deposited on pallet 52 in the assembly station, core veneer transfer roll 190 is indexed through 90° by the cooperating cylinder 218 and solenoid 230, shown in FIGS. 11 and 12. This drops the spread core veneer on top of the unspread back veneer previously placed on pallet 52. Table 74 thereupon advances with another veneer, either a center veneer or a face veneer, depending upon whether a 3, 5 or 7 ply assembly is contemplated. This is placed in position and another core veneer superimposed. Where the unspread veneers occur in pairs, as adjacent face and back veneers, each pair may be fed as a unit to economize time.

The sequence continues until an entire press load has accumulated on indexing table 51. The table then is indexed downwardly until the extending ends of pallet 52 engage conveyor chains 54, which move the stack away from the layup station and toward the next processing unit, for example toward the prepress.

The operation thus is timed and substantially automatic. Only three operators are required to work the entire line. In addition, since solid cores are used, the possibility of rejects occasioned by core gaps and laps is eliminated, as is the possobility of rejects due to inadequate glue spread. Thus the two principal difficulties attendant upon the operation of a conventional plywood mill—high labor costs, and a high percentage of rejects—in large measure are overcome.

It is to be understood that the form of my invention herein shown and described is to be taken as a preferred example of the same and that various changes in the shape, size and arrangement of parts may be resorted to without departing from the spirit of my invention.

Having thus described my invention, I claim:

1. Apparatus for assembling plywood veneers comprising:
   (a) assembly support means for supporting assembled veneers,
   (b) unspread veneer conveying means arranged for projecting face, back and center veneers endwise onto the assembly support means, the unspread veneer conveyor means including cantilevered table means supported for reciprocation in a single horizontal plane and drive means connected to the same for reciprocating it between an advanced position overlying the assembly support means and a retracted position withdrawn therefrom, and detent means associated with the assembly support means and movable between extended and retracted positions and operable when extended to contact the veneers in the advanced position of the table means and to restrain the veneers as the cantilever means moves to its retracted position,
   (c) core veneer transfer means positioned above the assembly support means in substantial registration therewith and arranged for receiving core veneers spread with unset glue and for supporting them by their side edges,
   (d) core veneer conveying means arranged for loading spread core veneers on the core veneer transfer means, and
   (e) adjusting means for the core veneer transfer means for adjusting the same between positions of core veneer support wherein the core veneers are supported above the assembly support means, and core veneer release wherein the core veneers are dropped downwardly upon the assembly support means.

2. The apparatus of claim 1 wherein the drive means comprise rack and pinion drive means.

3. Apparatus for assembling plywood veneers comprising:
   (a) assembly support means for supporting assembled veneers,
   (b) unspread veneer conveying means arranged for projecting face, back and center veneers endwise onto the assembly support means,
   (c) core veneer transfer means positioned above the assembly support means in substantial registration therewith and arranged for receiving core veneers spread with unset glue and for supporting them by their side edges, the core veneer transfer means comprising a pair of rotary support members arranged in spaced, parallel relationship along the side margins of a core veneer, each support member comprising a rotatably mounted shaft having mounted thereon a plurality of arms spaced from each other at predetermined angles and a plurality of pins spaced radially from the shaft circumferentially from each other at angular increments which are the same as the angular spacing between the arms, and indexing drive means for indexing the arms angularly between positions of core veneer support in which the core veneer is supported above the assembly support means, and core veneer release in which the core veneer is dropped downwardly between the arms upon the assembly support means, the indexing drive means comprising oppositely directed fluid-operated cylinder and electric solenoid means respectively engaging adjacent pins and having strokes predetermined to rotate the shaft one angular increment at a time,
   (d) core veneer conveying means arranged for loading spread core veneers on the core veneer transfer means, and
   (e) adjusting means for the core veneer transfer means for adjusting the same between positions of core veneer support wherein the core veneers are supported above the assembly support means, and core veneer release wherein the core veneers are dropped downwardly upon the assembly support means.

4. Apparatus for assembling plywood veneers comprising:
   (a) assembly support means for supporting assembled veneers,
   (b) unspread veneer conveying means arranged for projecting face, back and center veneers endwise onto the assembly support means, the unspread veneer conveying means including cantilevered table means comprising a table having longitudinal slots at its leading end, slide means supporting the table at its trailing end, rack and pinion reciprocating drive means connected to the table for reciprocating it between an advanced position overlying the assembly support means and a retracted position withdrawn therefrom, and detent means associated with the assembly support means and operable to contact the veneers in the advanced position of the table means and to restrain the veneers as the cantilever means moves to its retracted position, the detent means comprising a plurality of detent fingers, a rock shaft mounting the fingers, and fluid-operated cylinder means connected to the fingers for moving them between operative and inoperative positions wherein they engage the veneer in the advanced position of the table and clear the veneer from the table in the retracting motion thereof.

5. The apparatus of claim 4 wherein the table includes a plurality of pushing fingers, and resilient mounting means for the fingers arranged to permit their angular movement between a normally extended pushing position wherein they extend above the plane of the table for engaging the trailing end of the veneer, and a retracted position wherein they lie below the plane of the table for permitting passage of the veneer as it is loaded on the table.

6. The apparatus of claim 5 wherein each pushing finger comprises a bar, pin and knuckle means mounting the bar beneath the table, and spring means associated with the pin and knuckle means for urging the bar normally to its operative, pushing position.

(References on following page)

References Cited

UNITED STATES PATENTS

| | | | |
|---|---|---|---|
| 2,854,153 | 9/1958 | Rydberg et al. | 214—6 |
| 2,915,202 | 12/1959 | Aitken | 214—6 |
| 2,984,838 | 5/1961 | Parker | 214—6 XR |
| 3,169,646 | 2/1965 | Mason | 214—6 |
| 3,367,823 | 2/1968 | Clausen et al. | 156—557 XR |
| 3,381,829 | 5/1968 | Turner | 214—6 |
| 3,393,812 | 7/1968 | Mayo et al. | 214—6 |

HAROLD ANSHER, Primary Examiner

D. J. FRITSCH, Assistant Examiner

U.S. Cl. X.R.

156—364; 214—6